United States Patent Office 2,889,349
Patented June 2, 1959

2,889,349

ORGANOSILOXY ARYL PHOSPHONATES

William David Garden, Saltcoats, and James McAllan Cormack Thompson, West Kilbride, Scotland, assignors to Imperial Chemical Industries Limited, London, England, a corporation of Great Britain No Drawing. Application September 7, 1956
Serial No. 608,427

Claims priority, application Great Britain
November 7, 1955

8 Claims. (Cl. 260—448.2)

The present invention is concerned with new silicon-containing compounds and the use thereof.

Liquid organo-substituted polysiloxanes especially liquid hydrocarbon substituted polysiloxanes are excellent for lubrication under hydrodynamic or fluid film conditions because of their outstanding resistance to heat and oxidation at elevated temperatures, their low viscosity temperature coefficients and their low pour points. These compounds, however, when employed to lubricate two rubbing surfaces under "kinetic boundary" conditions, i.e. under conditions where a fluid film cannot be formed, or if formed cannot be maintained, due to the heavy loading between two relatively moving surfaces, do not give the desired reduction in friction or the necessary protection against "scuffing" or even seizure between these two rubbing surfaces. This is particularly pronounced when both rubbing surfaces are of steel.

The new compounds of the present invention are phosphorus-containing derivatives of polysiloxanes and those which contain 2 to 22 silicon atoms per molecule are particularly useful as lubricating fluids under kinetic boundary conditions.

According to the present invention the silicon-containing compounds have a polysiloxane grouping and at least one monovalent grouping of a neutral ester of an acid of phosphorus having only one phosphorus atom in its molecule, wherein any one of said monovalent groupings is united to the polysiloxane grouping through a hydrocarbon grouping, and wherein any of the ester radicals in said neutral ester contains not more than 8 carbon atoms and is not an alkenyl group.

Said acid of phosphorus having only one phosphorus atom in its molecule is preferably one capable of forming at least a di-ester and is particularly a phosphonic acid, when, it is to be understood said hydrocarbon grouping which unites the monovalent grouping to the polysiloxane grouping is connected directly to the phosphorus atom of this acid.

Preferably the compounds of the invention have 2 to 22 silicon atoms per molecule as these compounds are particularly useful as lubricating fluids under kinetic boundary conditions.

By a "polysiloxane grouping" is meant a grouping having at least one chain structure of alternating oxygen and silicon atoms wherein any of said chain structures terminate in silicon atoms.

In said polysiloxane grouping any valency which is not united to a monovalent grouping of a neutral ester of an acid of phosphorus having only one phosphorus atom in its molecule is connected to an alkyl or halogenoalkyl group containing not more than 6 carbon atoms or to an aryl, alkaryl, aralkyl or halogenoaryl group having not more than 12 carbon atoms.

Preferably the hydrocarbon grouping which unites any one of said monovalent groupings to the polysiloxane grouping is limited to one containing 6 carbon atoms when the grouping is an alkylene group and to 12 carbon atoms when this grouping is an arylene group.

Preferably said valencies which are said to be connected to an alkyl or halogenoalkyl group containing not more than 6 carbon atoms or an aryl, alkaryl, aralkyl or halogenoaryl group having not more than 12 carbon atoms are connected at least to a major proportion of methyl groups or a mixture of methyl and phenyl groups in which the methyl groups form at least half the total number.

The ester radicals in said monovalent grouping of a neutral ester of an acid of phosphorus having only one phosphorus atom in its molecule are preferably methyl, ethyl, propyl, butyl, phenyl and cresyl groups.

The number of monovalent groupings of a neutral ester of an acid of phosphorus having only one phosphorus atom in its molecule may be any integer from 1 upwards depending upon the number of silicon atoms per molecule. It is preferred, however, to have one or two such groupings and if two such groupings to have one on each terminal silicon atom.

Compositions comprising one or more of the aforesaid new compounds with or without for instance one or more liquid polysiloxanes also form part of the invention.

Examples of silicon-containing compounds according to the invention are diphenyl p-pentamethyldisiloxanylphenylphosphonate, diethylpentamethyldisiloxanylmethylphosphonate, diphenylpentamethyldisiloxanylmethylphosphonate, diphenyl p-(1:1:3:3-tetramethyl-3-phenyldisiloxanyl)phenylphosphonate, 1:3-bis(diethyl phosphonomethyl)tetramethyldisiloxane, and 1:3-bis(diphenyl p-phosphonophenyl)tetramethyldisiloxane.

A suitable method for the preparation of the compounds of the invention is for example to react a Grignard reagent, prepared from a halogenoalkyl or halogenoaryl silicon compound, with a dialkyl or a di-aryl phosphorochloridate. Another suitable method is to react the sodio-derivative of a dialkyl or diaryl phosphite with a halogenoakyl silicon compound. It is preferred to use the said phosphorochloridate process for the preparation of diaryl esters and said sodio-derivative procedure for the preparation of dialkyl esters.

The compounds of the invention which contain 2 to 22 silicon atoms per molecule whether used singly or in admixture with one another or in admixture with one or more polysiloxanes are particularly useful as lubricants under kinetic boundary conditions.

A homogeneous solution or a dispersion of any one or more of said compounds in any one or more of said polysiloxanes may be obtained depending on the solubility of the said compounds in the polysiloxanes. Where the lubricating power of the aforementioned compounds is very high, e.g. due to a particular form of molecular structure, they may with advantage be diluted with a polysiloxane since the resulting composition will have more nearly the desirable chemical and physical properties of the pure polysiloxane as well as the lubricating power of the compound. If the said compound is a low melting solid, a lubricating composition, which will operate over a wider temperature range than will the compound alone, can be made by dissolving it in a suitable polysiloxane.

Polysiloxanes for use as diluents in the lubricants of the invention may be prepared by hydrolysis of silanes or mixtures thereof which are substituted both by organic radicals such as alkyl, aryl, alkaryl, aralkyl, halogenoaryl or halogenoalkyl and by hydrolysable groups such as halogeno, alkoxy, aroxy, acyloxy or amino groups, for example dialkyldihalogenosilanes such as dimethyldichlorosilane, following by complete or partial condensation of the hydrolysis product. The polysiloxanes thus obtained may be treated with small amounts of strong sulphuric acid and a disiloxane such as hexamethyldisiloxane to produce "end-stopped" polysiloxanes. It is preferred that these polysiloxanes are completely hydrocarbon-substituted and that the ratio of hydrocarbon groups to silicon atoms is from 2.0 to 3.0. Suitable methods of preparing these are described in, for example British specifications Nos. 585,400, 586,189, 603,076, 626,909, 628,072 and 653,257.

The term "lubricating power" as used herein denotes the ability of any material to lubricate under kinetic boundary conditions and it is considered that the lubricating power of a material is inversely proportional to the coefficient of kinetic boundary friction between two specified rubbing surfaces lubricated with that material.

If desired, other ingredients, for example anti-oxidants, may be included in the lubricating compositions of the invention. Furthermore, metallic soaps, for example sodium or lithium soaps or thickeners, for example finely divided silica, asbestos floats, carbon black, arylureas or phthalocyanines, may also be included to make the lubricating compositions into greases.

The preparation of some silicon-containing compounds of the invention, their lubricating power and the lubricating power of compositions made therefrom are illustrated by the following examples. All parts are parts by weight and the lubricating power is found by determining the coefficient of kinetic boundary friction between two mild steel test pieces lubricated therewith on a friction machine of the type described by J. R. Bristow ("Kinetic Boundary Friction" Proc. Roy. Soc. A., 189, 1947, 88–102). The load on the lower test piece is 2 kg. and the determinations which are accurate to ±10% are made at various temperatures up to 200° C., the friction machine being used damped. These lubricating powers as determined are recorded in the table given subsequent to the examples.

EXAMPLE 1

Preparation of diphenyl p-pentamethyldisiloxanylphenylphosphonate

The intermediate compound p-bromophenylpentamethyldisiloxane is first prepared as follows:

192 parts of 1:3 - di(p - bromophenyl)tetramethyldisiloxane, 200 parts of hexamethyldisiloxane and 26 parts of 85% sulphuric acid are stirred together for 23 hours after which the mixture is washed with water followed by two washes with sodium carbonate solution and is dried for two hours over anhydrous potassium carbonate. Distillation at atmospheric pressure gives 128.5 parts of a fraction boiling at 100–102° C. composed largely of hexamethyldisiloxane. Further distillation under reduced pressure gives 120 parts of p-bromophenylpentamethyldisiloxane of boiling point 118–123° C. at 10 mm. The higher boiling residue (84.4 parts) is again treated with 100 parts of recovered hexamethyldisiloxane and 12 parts of 85% sulphuric acid to give a further 46.3 parts of p-bromophenylpentamethyldisiloxane.

60.6 parts of p-bromophenylpentamethyldisiloxane in 43 parts of dry ether are added dropwise to a solution of 4.88 parts magnesium in 43 parts of dry ether. The solution so obtained is reacted with 41.9 parts of diphenyl phosphorochloridate which is added dropwise thereto while stirring and cooling in an ice bath. Stirring is continued for 30 minutes after completion of the addition and the mixture is allowed to stand for 16 hours after which it is added to an ice-water mixture. The ether layer is then separated and the aqueous layer is extracted with more ether. The combined ether solutions are washed with a cold dilute caustic soda solution and dried over anhydrous sodium sulphate. The resulting ether solution is then distilled to remove the ether and all materials volatile below 170° C. at 0.15 mm. when 48.8 parts of a residue consisting essentially of diphenyl p-pentamethyldisiloxanylphenylphosphonate is obtained. Its lubricating power is determined and is recorded in the table under A.

Similar determinations are also carried out on two compositions, one of which consists of a 1% solution and the other of which consists of a 3% solution of the diphenyl p-pentamethyldisiloxanylphenylphosphonate in an "end-stopped" polymethylphenylsiloxane of 500 cs. viscosity at 25° C. and having a methyl plus phenyl:silicon ratio of just over 2:1 and a methyl:phenyl ratio of approximately 3:1 (polysiloxane 2). Their lubricating powers are recorded in the table under B and C respectively.

EXAMPLE 2

Preparation of diethylpentamethyldisiloxanylmethylphosphonate 4.6 parts sodium are added to 66 parts dry benzene in a stirred vessel having a reflux condenser fitted with a calcium chloride tube, the mixture is heated to reflux temperature, stirring is started and 27.6 parts diethyl hydrogen phosphite are added dropwise thereto. On completion of the reaction, i. e. 30 to 45 minutes after completion of addition of the phosphite, 48.2 parts of bromomethylpentamethyldisiloxane are added dropwise while stirring and the mixture is refluxed for a further 16 hours. The precipitated sodium bromide is removed by filtration and is washed with dry benzene after which the filtrate and washings are distilled to give 31.0 parts of diethylpentamethyldisiloxanylmethylphosphonate of boiling point 88–90° C. at 0.5 mm. or 116–124° C. at 9 mm.

The lubricating power of the diethylpentamethyldisiloxanylmethylphosphonate is recorded in the table under D. Two compositions are made up, one consisting of a 3% solution of diethylpentamethyldisiloxanylmethylphosphonate in an "end-stopped" polymethylsiloxane of 300 cs. viscosity at 38° C. and a methyl:silicon ratio of just over 2:1 (polysiloxane 1), and the other consisting of a 3% solution of diethylpentamethyldisiloxanylmethylphosphonate in polysiloxane 2. Their lubricating powers are recorded in the table under E and F respectively.

EXAMPLE 3

Preparation of diphenylpentamethyldisiloxanylmethylphosphonate 48.2 parts bromomethylpentamethyldisiloxane dissolved in 36 parts of dry ether are added to 4.8 parts of magnesium in 7 parts of dry ether, a small amount of iodine being added to the magnesium solution to initiate the reaction which proceeds smoothly during the addition of the disiloxane over a period of about 1 hour after which the mixture is refluxed for 1 hour. Unreacted magnesium is removed from the solution which is then added dropwise to a solution of 53.8 parts diphenylphosphorochloridate in 50 parts of dry ether while stirring and cooling, after which the mixture is allowed to stand at room temperature for 16 hours and thereafter is added to an ice-water mixture. The ethereal layer is separated, is washed several times with water, then with 1% sodium bicarbonate solution, and is dried over anhydrous sodium sulphate. On distillation 22.1 parts of diphenylpentamethyldisiloxanylmethylphosphonate having a boiling point of 158–162° C. at 0.1 mm. are obtained.

The lubricating power of this compound is determined and is recorded under G in the table. Two compositions are prepared from this compound one consisting of a 1% solution of this compound in polysiloxane 1 and the other consisting of a 3% solution of this compound in polysiloxane 1. Their lubricating powers are recorded in the table under H and I respectively.

EXAMPLE 4

Preparation of di-n-butyl pentamethyldisiloxanylmethylphosphonate

Di-n-butyl pentamethyldisiloxanylmethylphosphonate is prepared in a similar manner to diethyl petamethyldisiloxanylmethylphosphonate of Example 2 but using 38.8 parts of di-n-butyl hydrogen phosphite, 4.6 parts of sodium and 48.2 parts of bromomethylpentamethyldisiloxane. The reaction between the sodium and the phosphite requires 3 hours refluxing and the resulting sodium salt is refluxed with the disiloxane for 26 hours. Distillation gives 39.0 parts of di-n-butyl pentamethyldisiloxanylmethylphosphonate of boiling point 104–108° C. at 0.1 mm.

The lubricating power of this compound is determined and is recorded under J in the table. A composition is prepared consisting of a 3% solution of this compound in polysiloxane 1. The lubricating power of this composition is recorded under K in the table.

EXAMPLE 5

*Preparation of diphenyl p-(1:1:3:3-tetramethyl-3-phenyldisiloxanyl)-phenylphosphonate*

The intermediate compound 1-p-bromophenyl-3-phenyltetramethyldisiloxane is first prepared as follows.

40.0 parts of 1:3-diphenyltetramethyldisiloxane, 31.1 parts 1:3-di(p-bromophenyl)tetramethyldisiloxane and 2.2 parts of 85% sulphuric acid are shaken together for 44 hours. The mixture is washed free from acid, is dried over anhydrous potassium carbonate and is distilled to give 36.4 parts of 1-p-bromophenyl-3-phenyl-tetramethyldisiloxane of boiling point 115–125° C. at 0.1 mm.

A solution of 32.8 parts of 1-p-bromophenyl-3-phenyltetramethyldisiloxane in 36 parts of dry ether is added to 2.19 parts of magnesium in 18 parts of dry ether activated by addition of a small quantity of ethyl bromide and the mixture is refluxed for a further two hours after completion of the addition. The solution so obtained is reacted with 18.4 parts of diphenylphosphorochloridate dissolved in 14 parts of dry ether while stirring and cooling with an ice-water mixture, after which the mixture is maintained at room temperature for 16 hours, is poured into ice-water and the ethereal layer is separated and washed with dilute sodium carbonate solution and is subsequently dried over anhydrous sodium sulphate. The product so obtained is purified by removal of all the material volatile below 150° C. at 0.1 mm. pressure. 25.5 parts of diphenyl-p-(1:1:3:3-tetramethyl-3-phenyldisiloxanyl)phenylphosphonate are thus obtained as a residue.

The lubricating power of this compound is examined and is recorded under L in the table. Two compositions are prepared, one consisting of a 1% solution of the diphenyl p-(1:1:3:3-tetramethyl - 3 - phenyldisiloxanyl)-phenylphosphonate in polysiloxane 2 and of a 3% solution of diphenyl p-(1:1:3:3-tetramethyl-3-phenyldisiloxanyl)phenylphosphonate in polysiloxane 2. Their lubricating powers are recorded respectively under M and N.

EXAMPLE 6

*Preparation of 1:3-bis(diethyl phosphonomethyl)tetramethyldisiloxane*

4.6 parts of sodium are added to 66 parts dry benzene and the mixture is refluxed. 27.6 parts of diethyl hydrogen phosphite are then added dropwise while the mixture is mechanically stirred. After completion of the reaction of all the sodium, i.e. about 1 hour after completion of the addition of the phosphite, 32.5 parts of sym-bis-bromomethyltetramethyldisiloxane are added dropwise to the solution and the mixture is refluxed for 24 hours. The precipitated sodium bromide is removed by filtration and is washed with benzene after which the filtrate and washings are combined and distilled to give 19.0 parts of 1:3-bis(diethyl phosphonomethyl) tetramethyldisiloxane of boiling point 152–158° C. at 0.3 mm.

The lubricating power of this compound is given in the table under O. Two compositions are prepared one consisting of a 1% solution of 1:3-bis(diethyl phosphonomethyl)tetramethyldisiloxane in polysiloxane 1 and the other of a 3% solution of 1:3-bis(diethyl phosphonomethyl)tetramethyldisiloxane in polysiloxane 2. Their lubricating powers are recorded respectively under P and Q in the table.

EXAMPLE 7

*Preparation of* $(C_6H_5O)_2P(O)C_6H_4Si(CH_3)_2O[(C_6H_5)(CH_3)SiO]_nSi(CH_3)_2C_6H_4P(O)(OC_6H_5)_2$ 5.5 parts of the intermediate 1:3-bis(diphenyl p-phosphonophenyl)tetramethyldisiloxane, 20 parts of a methylphenylpolysiloxane made by hydrolysis of methylphenyldichlorosilane and 1.7 parts of 85% sulphuric acid are agitated together for 24 hours. The product is washed free from acid, is dried over anhydrous sodium sulphate and the fraction boiling below 150° C. at 1 mm. pressure is removed therefrom by distillation. The product which is obtained as a residue consists essentially of an end-phosphonated methylphenylpolysiloxane of the formula—

$(C_6H_5O)_2P(O)C_6H_4Si(CH_3)_2O[(C_6H_5)$
$(CH_3)SiO]_nSi(CH_3)_2C_6H_4P(O)(OC_6H_5)_2$ where the average value of $n$ is 20. The lubricating power of this product is given in the table under R.

EXAMPLE 8

The procedure of Example 7 is adopted except that 10 instead of 20 parts of methylphenyl polysiloxane are used when a product is obtained wherein the mean value of $n$ is 10. The lubricating power of this product is given in the table under S.

EXAMPLE 9

The procedure of Example 7 is adopted except that 4 instead of 20 parts of methylphenyl polysiloxane are used when a product is obtained wherein the mean value of $n$ is 4. The lubricating power of this product is given in the table under T.

EXAMPLE 10

*Preparation of 1:3-bis(diphenyl p-phosphonophenyl) tetramethyldisiloxane*

A Grignard solution is prepared from 7.29 parts of magnesium, 80 parts of dry ether and 66.6 parts of 1:3-bis(p-bromophenyl)tetramethyldisiloxane and is reacted with 54.6 parts diphenylphosphorochloridate. The resulting mixture is washed free of acid, is dried over anhydrous sodium sulphate and the fraction volatile below 170° C. at 0.15 mm. is removed by distillation. 69.0 parts of 1:3-bis(diphenyl p-phosphonophenyl)tetramethyldisiloxane are thus obtained as a residue. The lubricating power of this compound is determined and is recorded in the table under U. Three further compositions are made by dissolving 10%, 3% and 1% of this compound in polysiloxane 2. Their lubricating powers are recorded in the table under V, W and X respectively.

EXAMPLE 11

*Preparation of dicyclohexyl pentamethyldisiloxanylmethylphosphonate*

Dicyclohexyl pentamethyldisiloxanylmethylphosphonate is prepared in a similar manner to Example 2 but using 49.0 parts of dicyclohexyl hydrogen phosphite, 4.6 parts of sodium and 48.2 parts of bromomethylpentamethyldisiloxane. The formation of the sodium salt requires 4 hours refluxing and the sodium salt and disiloxane are refluxed for 24 hours. Distillation gives 24.5 parts of dicyclohexyl pentamethyldisiloxanylmethylphosphonate of boiling point 130–136° C. at 0.1 mm.

The lubricating power of this compound is determined and is recorded under Y in the table. A composition is prepared consisting of a 3% solution of this compound in polysiloxane 2. The lubricating power of this composition is recorded in the table under Z.

For purposes of comparison the lubricating powers of polysiloxanes 1 and 2 are determined and are recorded in the table. It will be seen from the table that the new compositions of the invention have greatly improved lubricating powers with respect to polysiloxane 1 and polysiloxane 2.

LUBRICATING POWER OF LUBRICANTS ACCORDING TO EXAMPLES 1-11

| Lubricant | Coefficient of friction (temperature, °C.) | | | | | | | |
|---|---|---|---|---|---|---|---|---|
| | 20 | 60 | 100 | 120 | 140 | 160 | 180 | 200 |
| A | 0.13 | 0.16 | 0.20 | 0.22 | 0.22 | 0.23 | 0.28 | 0.28 |
| B | 0.12 | 0.11 | 0.12 | 0.10 | 0.10 | 0.09 | 0.10 | 0.08 |
| C | 0.15 | 0.13 | 0.11 | 0.10 | 0.10 | 0.10 | 0.09 | 0.08 |
| D | 0.08 | 0.07 | 0.06 | 0.05 | 0.06 | 0.07 | 0.06 | 0.10 |
| E | 0.17 | 0.19 | 0.22 | 0.24 | 0.21 | 0.22 | 0.22 | 0.20 |
| F | 0.15 | 0.17 | 0.18 | 0.18 | 0.15 | 0.21 | 0.20 | 0.16 |
| G | 0.13 | 0.11 | 0.10 | 0.09 | 0.09 | 0.08 | 0.08 | 0.07 |
| H | 0.12 | 0.17 | 0.26 | 0.25 | 0.45 | 0.34 | 0.33 | 0.46 |
| I | 0.13 | 0.14 | 0.21 | 0.20 | 0.20 | 0.18 | 0.24 | 0.20 |
| J | 0.07 | 0.06 | 0.05 | 0.04 | 0.05 | 0.05 | 0.03 | 0.04 |
| K | 0.12 | 0.12 | 0.10 | 0.14 | 0.17 | 0.18 | 0.16 | 0.19 |
| L | 0.13 | 0.12 | 0.10 | 0.09 | 0.09 | 0.07 | 0.07 | 0.07 |
| M | 0.12 | 0.11 | 0.11 | 0.11 | 0.10 | 0.09 | 0.08 | 0.08 |
| N | 0.12 | 0.11 | 0.10 | 0.10 | 0.08 | 0.08 | 0.08 | 0.07 |
| O | 0.21 | 0.26 | 0.32 | 0.28 | 0.32 | 0.25 | 0.21 | 0.18 |
| P | 0.22 | 0.27 | 0.25 | 0.26 | 0.23 | 0.28 | 0.29 | 0.30 |
| Q | 0.14 | 0.21 | 0.24 | 0.27 | 0.28 | 0.33 | 0.35 | 0.37 |
| R | 0.12 | 0.26 | 0.31 | 0.32 | 0.41 | 0.37 | 0.38 | 0.43 |
| S | 0.14 | 0.26 | 0.44 | 0.41 | 0.49 | 0.47 | 0.51 | 0.53 |
| T | 0.14 | 0.19 | 0.23 | 0.25 | 0.28 | 0.30 | 0.32 | 0.31 |
| U | 0.12 | 0.12 | 0.10 | 0.10 | 0.09 | 0.11 | 0.09 | 0.07 |
| V | 0.13 | 0.12 | 0.11 | 0.11 | 0.10 | 0.09 | 0.09 | 0.07 |
| W | 0.12 | 0.12 | 0.15 | 0.14 | 0.16 | 0.16 | 0.14 | 0.13 |
| X | 0.13 | 0.14 | 0.13 | 0.13 | 0.13 | 0.12 | 0.11 | 0.10 |
| Y | 0.15 | 0.23 | 0.24 | 0.23 | 0.21 | 0.19 | 0.18 | 0.19 |
| Z | 0.19 | 0.25 | 0.33 | 0.25 | 0.34 | 0.37 | 0.38 | 0.39 |
| Polysiloxane 1 | 0.62 | 0.77 | 0.77 | 0.73 | 0.80 | 0.78 | 0.76 | |
| Polysiloxane 2 | 0.14 | 0.19 | 0.67 | 0.76 | 0.78 | 0.95 | 0.93 | |

What we claim is:

1. Silicon-containing compounds having the general formula

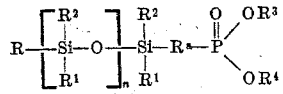

wherein $n$ is an integer from 1–21, R is selected from the group consisting of alkyl and halo alkyl groups having not more than 6 carbon atoms, aryl, alkaryl, aralkyl and haloaryl groups having not more than 12 carbon atoms and the group

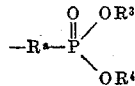

$R^1$ and $R^2$ are selected from the group consisting of alkyl and haloalkyl groups having not more than 6 carbon atoms and aryl, alkaryl, aralkyl and haloaryl groups having not more than 12 carbon atoms, $R^a$ is an arylene group having not more than 12 carbon atoms and $R^3$ and $R^4$ are selected from the group consisting of methyl, ethyl, propyl, butyl, phenyl and cresyl groups.

2. Silicon-containing compounds as claimed in claim 1 wherein a major proportion of said groups R, $R^1$ and $R^2$, are methyl groups.

3. Silicon-containing compounds as claimed in claim 1 wherein of said groups R, $R^1$ and $R^2$, at least half are methyl groups and the remainder are phenyl groups.

4. Silicon-containing compounds as claimed in claim 1 wherein $R^3$ and $R^4$ are phenyl groups.

5. A silicon-containing compound consisting of diphenyl p-pentamethyldisiloxanylphenylphosphonate.

6. A silicon-containing compound consisting of diphenyl p-(1:1:3:3-tetramethyl-3-phenyldisiloxanyl)phenylphosphonate.

7. A silicon-containing compound consisting of 1:3-bis(diphenyl p-phosphonophenyl)tetramethyldisiloxane.

8. A method for the preparation of a silicon-containing compound as claimed in claim 1, which comprises reacting a Grignard reagent prepared from a halogenoaryl organo silicon compound with a phosphorochloridate selected from the group consisting of dialkyl and diaryl phosphorochloridates.

References Cited in the file of this patent

UNITED STATES PATENTS

| 2,381,366 | Patnode | Aug. 7, 1945 |
| 2,507,316 | McGregor et al. | May 9, 1950 |
| 2,673,210 | Frisch et al. | Mar. 23, 1954 |
| 2,768,193 | Gilbert | Oct. 23, 1954 |

OTHER REFERENCES

Arbuzov et al.: "Dokladii Akad. Nauk" (USSR Academy of Science Reports), vol. 59 (No. 8), pages 1433–35 (1948). "Organosilicon Literature," vol. 5, pages 116–20.